T. SIMMONS.
VACUUM FILTER.
No. 62,505. Patented Feb. 26. 1867.
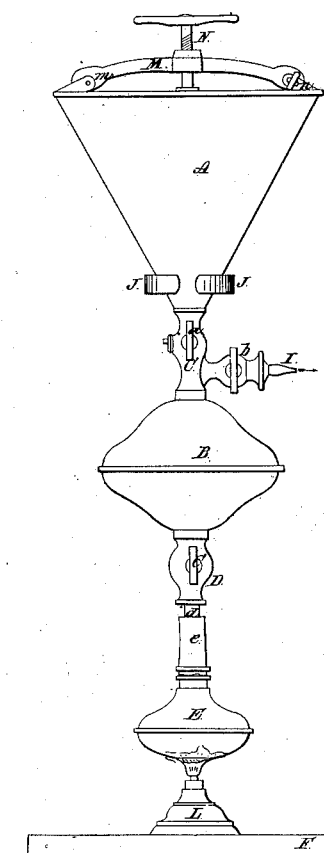
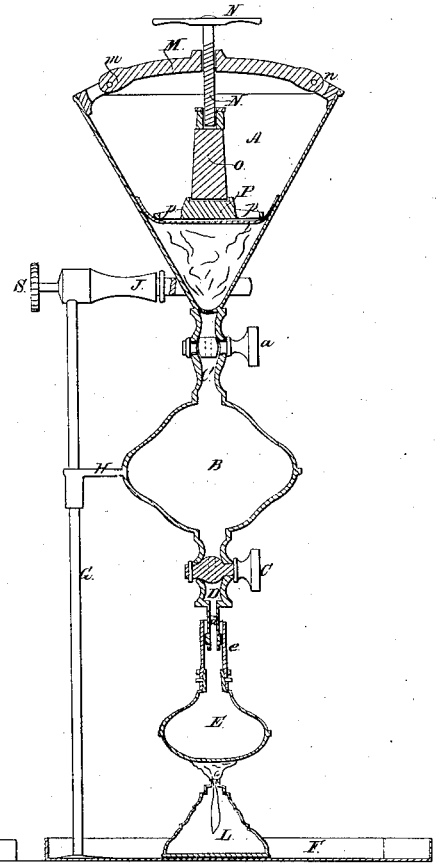
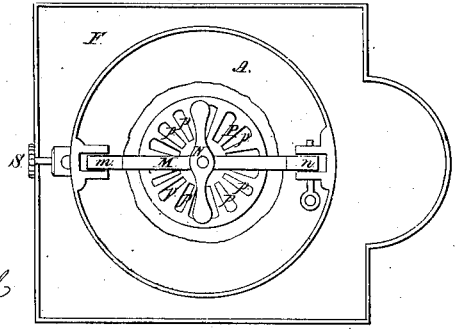

United States Patent Office.

THOMAS SIMMONS, OF CHICAGO, ILLINOIS.

Letters Patent No. 62,505, dated February 26, 1867; antedated February 15, 1867.

---

IMPROVEMENT IN VACUUM FILTERS.

---

*The Schedule referred to in these Letters Patent and making part of the same.*

---

TO ALL WHOM IT MAY CONCERN:

Be it known that I, THOMAS SIMMONS, of Chicago, in the county of Cook, and State of Illinois, have invented a new and useful Improvement in Vacuum Filters; and I do hereby declare and make known that the following is a full, clear, and exact description of the same, reference being had to the accompanying drawings, and the letters and figures marked thereon, which form part of this specification.

My said invention relates more particularly to filters for the use of chemists, but it may be used with equal facility and effect for all other appropriate purposes.

To enable those skilled in the art to understand how to construct and use my invention, I will proceed to describe the same with particularity, making reference in so doing to the aforesaid drawings, in which —

Figure 1 represents a side elevation of my invention.

Figure 2, a central vertical section of the same; and

Figure 3, a plan or top view of the filtering vessel.

Similar letters of reference in the several figures denote like parts of my invention.

A represents the filtering vessel, which rests upon a support, J, which is attached upon a standard, G, by means of a set-screw, S, so as to be adjusted upon said standard at different heights, as may be desired. Across the top of the vessel A is arranged a bar, M, hinged at $m$, upon one side thereof, and secured to the other side at $n$ by a removable pin, as shown. Through this arm works a vertical screw, N, whose lower end rests upon a block, O, which in turn rests upon a press, P, which is provided with suitable openings $p$ through which any liquids may pass. By means of this arrangement the filtering material may be compressed to any desired degree of compactness. B represents a close vessel, connected with the filtering vessel by a tube or pipe marked C, which is provided with a stop-cock, $a$, to shut off communication between said vessels A B, when desired, and also with an outlet pipe, I, which is provided with a stop-cock, $b$. At the bottom said vessel B is provided with an outlet pipe, D, having a stop-cock thereon, marked $c$, and a nipple, $d$, upon which the flexible tube $e$, upon the vessel E, may be arranged so as to form a tight joint, as shown. L represents a lamp, which is used for generating steam in the vessel E, as and for the purposes hereinafter set forth.

The operation of my invention is as follows: The filter is arranged in the vessel A and compressed to the requisite degree of compactness by means of the press P, the cock $a$ turned so as to shut off communication with the vessel B, and the outlet I opened, as also is the tube D between the vessels B and E. The lamp L, beneath the vessel E, which is to contain a suitable quantity of water, is lighted, and the steam which is generated in the vessel E passes up into the vessel B, and expels the air therefrom through the pipe I. When the air has all been expelled from said vessel and the chamber is filled with steam, the stop-cocks $b$ and $c$ are closed and the stop-cock $a$ opened, and the lamp L may be removed, and the flexible tube $e$ detached from the tube D. The liquid to be filtered, (having been previously placed in the vessel A,) when the steam condenses in the chamber B and forms a vacuum therein, is then forced down through the filter into the said vessel B by the atmospheric pressure, and the operation is thus accomplished with great rapidity, and obviates the liability of the liquids to evaporate, as is the case in the long filtering processes in ordinary use among chemists.

Having described my invention, I will now proceed to specify what I claim, and desire to secure by Letters Patent:

1. I claim the combination and arrangement of the filtering vessel A, receiver B, and removable generator E, when connected by tubes C D, provided with stop-cocks $a\,b\,c$, and operating substantially as herein specified and for the purposes set forth.

2. I claim the combination of the press P, vessel A, receiver B, generator E, tubes C D, provided with stop-cocks as shown, arranged and operating as and for the purposes shown and set forth.

THOMAS SIMMONS.

Witnesses:
WILLIAM HAYWOOD,
W. E. MARRS.